(12) United States Patent
Tokuda et al.

(10) Patent No.: US 6,988,063 B2
(45) Date of Patent: Jan. 17, 2006

(54) SYSTEM AND METHOD FOR ACCURATE GRAMMAR ANALYSIS USING A PART-OF-SPEECH TAGGED (POST) PARSER AND LEARNERS' MODEL

(75) Inventors: Naoyuki Tokuda, Tokyo (JP); Liang Chen, British Columbia (CA); Hiroyuki Sasai, Tokyo (JP)

(73) Assignee: SunFlare Co., Ltd., Tokyo (JP)

( * ) Notice: Subject to any disclaimer, the term of this patent is extended or adjusted under 35 U.S.C. 154(b) by 670 days.

(21) Appl. No.: 10/072,973

(22) Filed: Feb. 12, 2002

(65) Prior Publication Data

US 2003/0154066 A1  Aug. 14, 2003

(51) Int. Cl.
G06F 17/27 (2006.01)

(52) U.S. Cl. ............................. 704/9; 717/143; 706/45

(58) Field of Classification Search ................. 704/9, 704/1–8; 717/106, 117, 141–144; 706/45–48
See application file for complete search history.

(56) References Cited

U.S. PATENT DOCUMENTS

| | | | |
|---|---|---|---|
| 5,146,405 A | | 9/1992 | Church |
| 5,799,269 A | * | 8/1998 | Schabes et al. ............... 704/9 |
| 5,878,386 A | | 3/1999 | Coughlin |
| 6,182,028 B1 | * | 1/2001 | Karaali et al. ............... 704/9 |
| 6,598,019 B1 | * | 7/2003 | Tokuda et al. ............... 704/255 |
| 6,606,597 B1 | * | 8/2003 | Ringger et al. ............. 704/270 |
| 6,721,697 B1 | * | 4/2004 | Duan et al. ............... 704/9 |
| 6,804,637 B1 | * | 10/2004 | Tokuda et al. .............. 704/2 |
| 2002/0026306 A1 | | 2/2002 | Bangalore et al. |
| 2002/0059066 A1 | | 5/2002 | O'Hagen |
| 2003/0004716 A1 | | 1/2003 | Haigh et al. |

OTHER PUBLICATIONS

"A Corpus-based probabilistic Grammar with Only Two Non-Terminals" Satoshi Sekine and Ralph Grishman, (1996), 4th International Workshop on Parsing Technology, pp. 216-233—Apple-Pie Parser.

* cited by examiner

Primary Examiner—Antony Nguyen-Ba
(74) Attorney, Agent, or Firm—Jacobson Holman PLLC

(57) ABSTRACT

An accurate grammar analyzer that works effectively even with error-ridden sentences input by learners, based on a context-free probabilistic statistical POST (part-of-speech tagged) parser, for a template-automation-based computer-assisted language learning system. For any keyed-in sentence, the parser finds a closest correct sentence to the keyed-in sentence from among the embedded template paths exploiting a highest similarity value, and generates a grammar tree for the correct sentence where some ambiguous words are preassigned by expert language teachers. The system marks the errors under the leaves of the grammar tree by identifying the differences between the keyed-in sentence and the grammar tree of the correct sentence as errors committed by learners. By identifying most frequently recurring grammatical errors of each student, the system sets up a learner's model, providing a unique level of contingent remediation most appropriate to each learner involved.

2 Claims, 3 Drawing Sheets

| NP(DT NN)       | DT | 3 |
|-----------------|----|---|
| PP(IN NP)       | IN | 2 |
| NP(NP ADJP(JJ)) | JJ | 1 |

| NP(DT NN)       | DT, NN | 4 |
|-----------------|--------|---|
| PP(IN NP)       | IN     | 2 |
| NP(NP ADJP(JJ)) | JJ     | 1 |
| VP(VBZ NP PP)   | VBZ    | 1 |

SYSTEM AND METHOD FOR ACCURATE GRAMMAR ANALYSIS USING A PART-OF-SPEECH TAGGED (POST) PARSER AND LEARNERS' MODEL

BACKGROUND OF THE INVENTION

1. Field of the Invention

The present invention is related to the field of automated learning systems and, more particularly, to a part-of-speech tagged parser for use in an intelligent computer-assisted language learning (ICALL) system.

2. Description of the Related Art

Systems and methods for learning a second language have incorporated computer-assisted technology. Such computer-assisted systems may act to simulate a human teacher in diagnosing and coaching students as they learn to write in, for example, English. However, these systems lack at least two basic components needed for the pedagogical purposes of language learning, namely a grammar analyzer and a learners' model.

Due to context sensitive cases, under the current state of the art of natural language processing technology, it is not possible to provide syntactic analysis of arbitrary or ambiguous sentences in natural language with an acceptable accuracy of 95% or greater.

SUMMARY OF THE INVENTION

In view of the foregoing, one object of the present invention is to overcome the difficulties of accurately analyzing arbitrary or ambiguous sentences in natural languages using a computer-assisted system implemented using a computer.

Another object of the invention is to provide an accurate grammatical analyzer for providing general grammar guidelines which are contingent on student inputs.

A further object of the invention is a parser with increased accuracy obtained by manually assigning a tag(s) to at least some of the ambiguous words in natural language.

Yet another object of the invention is a computer-implemented parser enabling a language student to obtain a syntactically bracketed grammar structure for a correct sentence in which student errors are noted in a parse or grammar tree.

A still further object of the invention is a learners' model capable of recognizing frequently occurring grammatical errors by a particular student and of providing contingent remediation that exploits such frequently occurring errors so that correction is directed to the particular needs of the student.

In accordance with these and other objects, the present invention builds from a flexible intelligent computer-assisted language learning (ICALL) system which provides a realistic, computer-implementable method for intelligent language tutoring of foreign languages, particularly second language composition and/or technical translation. Such a system is set forth in pending U.S. patent applications, Ser. Nos. 09/597,269 and 09/597,270 which applications are hereby incorporated herein by reference in their entirety.

The template-automaton-based ICALL system provides on-line tutoring capability for English composition using a computer which enables teachers to build in pedagogic contents and plan a learning strategy without any help from knowledge engineers. In the ICALL system, expertise in grammar analysis and grammatical remediation is extracted into the knowledge base of templates by language experts.

In the referenced patent applications as incorporated herein, a robust algorithm is developed for bug identification by matching the input sentence against template paths stored in the computer. This algorithm is capable of predicting a most plausible incorrect sentence in view of the errors students commit, thereby generating the most contingent remediative feedback to student errors. This implies that, if an accurate parser capable of processing a well-formed sentence(s) can be provided, the parser can also be used to process the syntactically erroneous inputs by merely pointing out the differences. Yet, even for sentences that are grammatically correct, it is still necessary to develop a parser program that can consistently provide a correct grammar tree.

In the present invention, a part-of speech tagged (POST) parser is constructed which is capable of providing an accurate grammar tree of a well-formed sentence(s) in the templates. To implement the POST parser scheme to the current template in the ICALL, the structure of the template is modified so that the part-of-speech tags may be added to any word or phrase in the correct nodes of the template. After adding necessary part-of-speech tags sufficient for disambiguation purpose into the template, some known probabilistic parsers may be used to obtain grammar trees of correct sentences in the templates, by ignoring the tagging process with respect to the words or phrases that have been manually tagged by language experts. By using the so-called part-of-speech tagged parser, it is possible to modify the whole process of the ICALL system.

The present invention is further directed to a computer-implemented learners' model which, by identifying a "minimum syntactic subtree" or smallest grammar component of a relevant error, is effective in describing the grammar errors of an input sentence and may be used to maintain a historical record of each student describing a grammar error table together with its location visualized within the syntactic subtrees.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
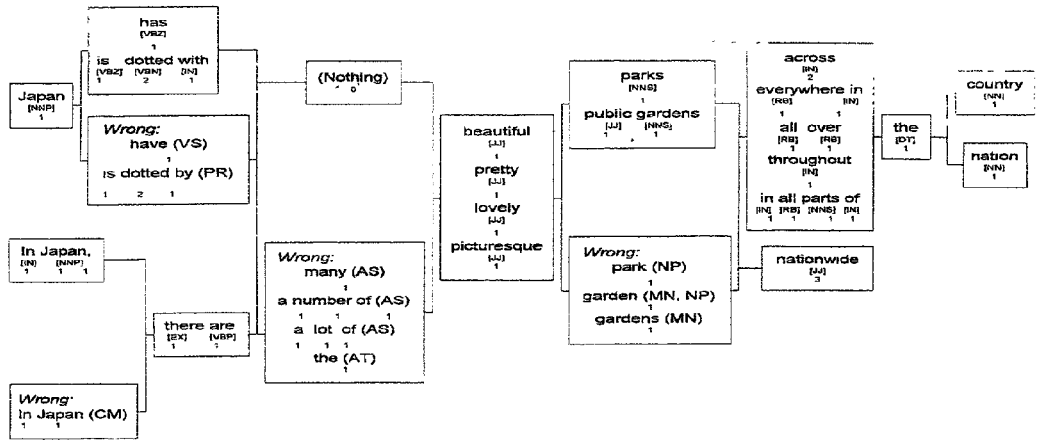
FIG. 1 shows an example of template structure after adding the part-of-speech tags to all the words in the correct nodes.

In describing a preferred embodiment of the invention illustrated in the drawings, specific terminology will be resorted to for the sake of clarity. However, the invention is not intended to be limited to the specific terms so selected, and it is to be understood that each specific term includes, all technical equivalents which operate in a similar manner to accomplish a similar purpose.

The POST parser according to the present invention involves a modification of the so-called corpus-based probabilistic parsers, whereby tags are pre-assigned and hence constraints are imposed on an unnecessarily large number of potential combinations of tag assignments in the part-of-speech tags of certain words or phrases. The present invention may be incorporated within the scheme of the Apple-Pie parser (Sekine, S. and Grishman, R. (1996), "A Corpus-based Probabilistic Grammar with Only Two Non-Terminals", 4th International Workshop on Parsing Technology, pp. 216–223), where a combination of the following formula is chosen to maximize the probability of the final grammar tree. The probability of a final grammar tree can be calculated as, $$P_{tree}(T) = \prod_{rule_i in T} P_{rule_i} \cdot \prod_{tag_j of\ word_j in T} (P(tag_j | word_j))^2$$

where $P_{rule_i}$ denotes the probability of a rule to take on $rule_j$, while $P(tag_j|word_j)$ is the probability of $word_j$ to be assigned to part-of-speech tag, $tag_j$. It should be noted that the same word can be assigned to any of multiple, different part-of-speech tags.

According to the rule base and the possible tags of each word stored in any probabilistic context free grammar, including Apple-Pie, a plurality of grammar trees are obtained using a standard bottom-up chart approach (See, for example, James Allen, Natural Language Understanding, $2^{nd}$ ed, Benjamin/Cummins Publishing Company, Inc., pp. 54–60). The above formula for calculating the final grammar tree is then used to select the grammar tree with largest probability.

Two major modifications are made to the algorithm of the Apple-Pie parser. First, any phrase preassigned with a POS tag is regarded as one word. Second, when preassigned, the probability of such words is always regarded as "1", setting probabilities of words having a tag as "0" if the words have been assigned with a different tag.

FIG. 1 shows a typical template for an English translation of a Japanese sentence meaning, "Japan is dotted with beautiful gardens nationwide." For the purposes of the following description, a given student's input sentence is, "Japan are dotted by beautiful gardens nationwide." The numbers under each of the words denote weights assigned to the word representing its relative importance. The node with "(Nothing)" on is an empty node meaning that no word is needed. Typical part-of-speech tags may include the following:

| DT: | Determiner | EX: | Existential |
|---|---|---|---|
| IN: | Preposition/Subord. conjunction | JJ: | Adjective |
| NN: | Noun, singular or mass | NNS: | Noun, plural |
| NNP: | Proper noun, singular | RB: | Adverb |
| VBN: | Verb, past particle | VBP: | Verb, non-3rd ps. sing. present |
| VBZ: | Verb, 3rd ps. sing. present | | |

In addition to the particular part-of-speech tags, various error messages are also indicated. These include:

| AS: | an assumption has been made on the quantity of noun | AT: | the article is not needed |
|---|---|---|---|
| CM: | a comma is needed | CT: | contraction is incorrect |
| MN: | meaning is incorrect | NP: | noun must be plural |
| PP: | phrase must be plural | PP: | preposition is incorrect |
| VA: | verb must be singular, since subject is singular | | |

Figure 2:
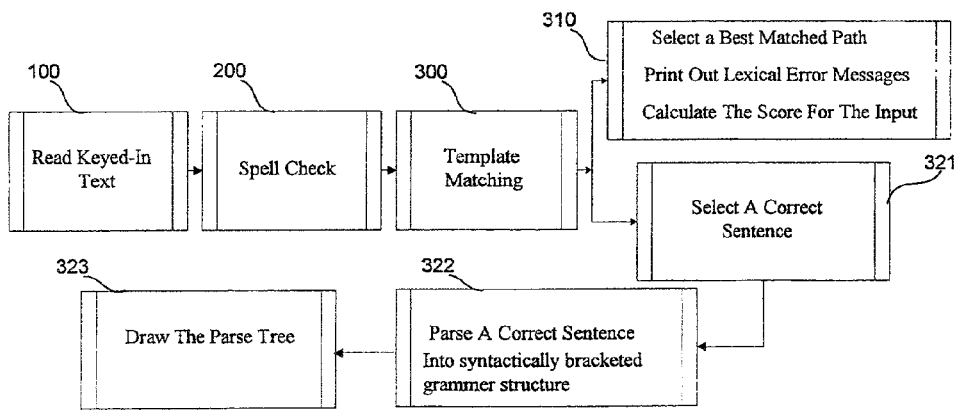
FIG. 2 provides the processing procedure of the template-based ICALL system enhanced by the POST parser providing a single input.

The procedure for applying the POST parser in the template-automaton-based ICALL system for the individual remediation of syntactic errors is summarized in FIG. 2. More specifically, for the given student's input sentence, which is generally keyed into a computer, the method begins by reading the input sentence, step 100. The sentence is checked with a standard spell check model, and spelling errors are corrected, step 200. Template matching is then undertaken by the computer with the template matching algorithm set forth in the referenced patent applications, step 300. Using this algorithm, the best matched path having a highest similarity value with the sentence is selected, lexical error information is printed, and the score of the input sentence is calculated, step 310. Feedback information is also provided.

According to the error feedback information, the correct path in the template is identified, step 321. The POST parser is then applied to obtain a syntactically bracketed grammar structure for the correct path, step 322. The grammar tree of the correct path is then drawn, with the errors marked at the leaves of such grammar tree, step 323.

With particular reference to the template of FIG. 1, using the ICALL system the best-matched path can be found to be "Japan is dotted with beautiful parks nationwide." Given this path, the system of the present invention is able to provide comments on lexical errors as well as remedial suggestions, step 310, through application of which the student's input sentence is corrected. Then in step 322 the POST parser obtains a syntactically bracketed grammar structure for the correct sentence: S(NPL(NNP(Japan)) VP(VBZ(is) VP(VBN(dotted) PP(IN(with) NP(NPL(JJ (beautiful) JJ(public) NNS(parks)) ADJP(JJ(nationwide))))))–PERIOD-(.)).

Figure 3:
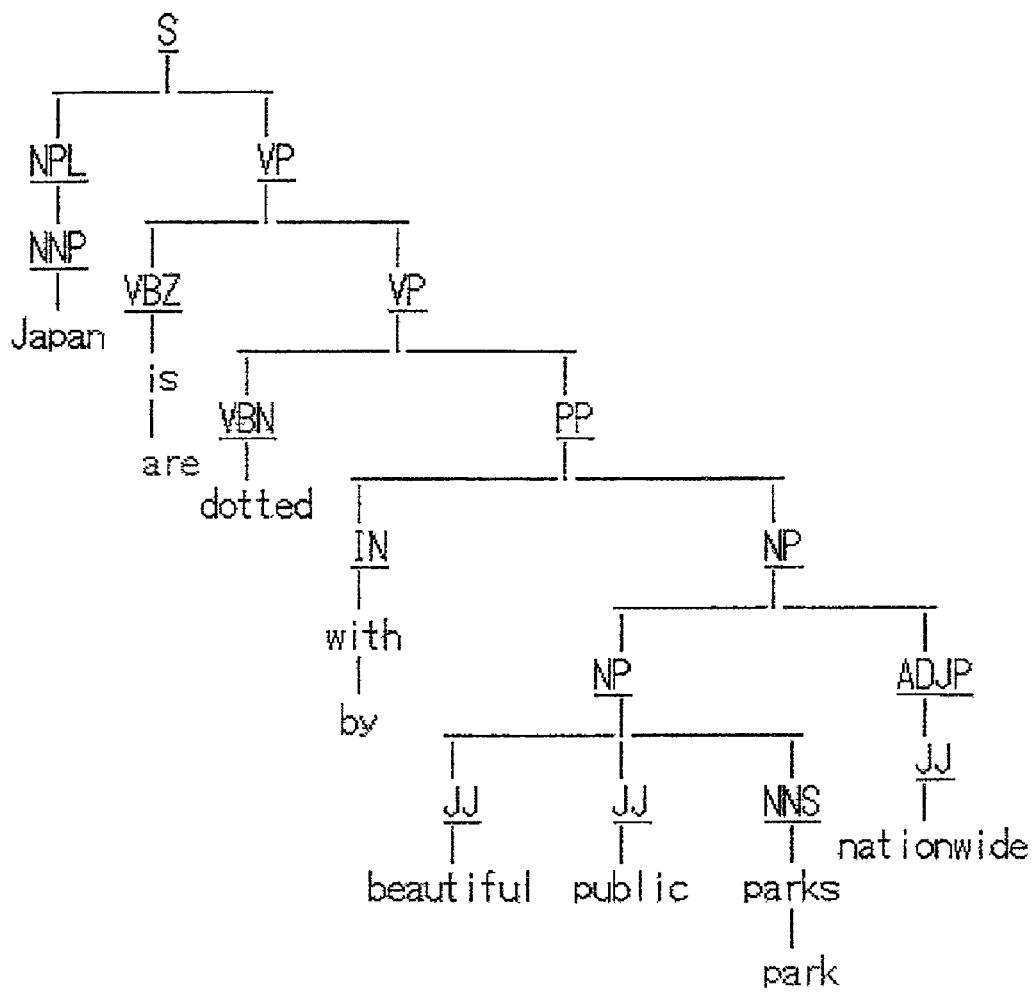
FIG. 3 is an example of the grammar remediation tree of an input sentence.

Finally, according to step 323 and as representatively shown in FIG. 3, the grammar tree of the correct path is drawn with the errors made by the student marked thereon. The errors may be marked in red within the relevant leaves of the grammar tree. In FIG. 3, the words "are", "by" and "park" would be marked in red.

The present invention further provides a learners' model for the ICALL system, enabling an effective pedagogic tutoring strategy. The tree information representatively shown in FIG. 3 identifies what is called a Minimum Syntactic Subtree, namely a smallest grammar component of a relevant error(s). This is effective in describing the grammar errors of the input sentence. Each syntactic subtree can, of course, be expressed in a syntactically bracketed format. With the present invention it is possible to maintain the student's historical record using a grammar error table together with its location visualized within the syntactic subtrees (in syntactically bracketed format).

On the other hand, the HCS matching algorithm as set forth in U.S. patent application Ser. Nos. 09/597,269 and 09/597,270, is capable of providing a student proficiency level by evaluating the student's written English against the best-matched path of a model sentence in the template.

When combined with the information of the grammatical error location given in the tables of this invention, the system can recognize the most frequently recurring grammatical errors of each student, based on the proficiency level of each student. The system then provides a unique level of contingent remediation exploiting the most frequent grammatical errors of the student involved.

The learners' model according to the present invention provides a computer-implemented system and method for evaluating the proficiency level of a student's writing ability, recognizing grammatical errors, and providing proficiency level contigent feedback and remediation.

A. Evaluating Proficiency Level of Writing Ability

The HCS algorithm of the patent applications previously incorporated by reference allows a student's basic proficiency in writing to be evaluated by matching each input sentence with the template paths, where the score of the input sentence is calculated by:

$$\text{Score} = \frac{\text{Weight of } HCS}{\text{Weight of the Matched Patch}} \times \frac{\text{Number of Matched Correct Words in Input}}{\text{Length of Input}}$$

The proficiency level of a student is decided by means of the scores of the most recent inputs. For example, students may be classified into three groups for evaluation, namely high level learners with mean scores greater than 0.9, low level learners with mean scores lower than 0.7, and middle level learners with scores between 0.7 and 0.9.

B. Grammar Error Recognition

As already noted, the present invention uses a computer to perform grammar error recognition on the basis of a Minimum Syntactic Subtree, which may be defined by example. Suppose a is the nearest ancestor of leaf b, which has at least two direct descendants. The set of trees including all the direct descendants of a, and the ancestors of b up to a, is called a Minimum Syntactic Subtree of leaf b. A syntactic error is defined as the minimum syntactic subtree of a leaf of the grammar tree that is matched with the words marked as errors.

The procedure of recording and correcting the syntactic errors detected using the computer is described hereinafter. First, obtain the grammar tree of the matched correct sentence in the template by the POST parser, and match the input sentence to leaves of the grammar tree. For each leaf l of the grammar tree that is matched with the words marked as errors, find the Minimum Syntactic Subtree of leaf l and associate l with the subtree. For all the subtrees found, combine those leaves that are associated with the same subtree, i.e., allow subtrees associated with more than one leaf. For each subtree with the associated leaves, search the user's syntactic error table and if there is a same subtree in the table, add "1" to the frequency field of the row and add all the leaves of the subtree into the associated leave field of the row, if any of the leaves is not registered in the field as yet. Conversely, if there is not a same subtree in the table, add the subtree as well as the associated leaves into the table, assigning "1" to the frequency field.

Figures 4, 5, 6:
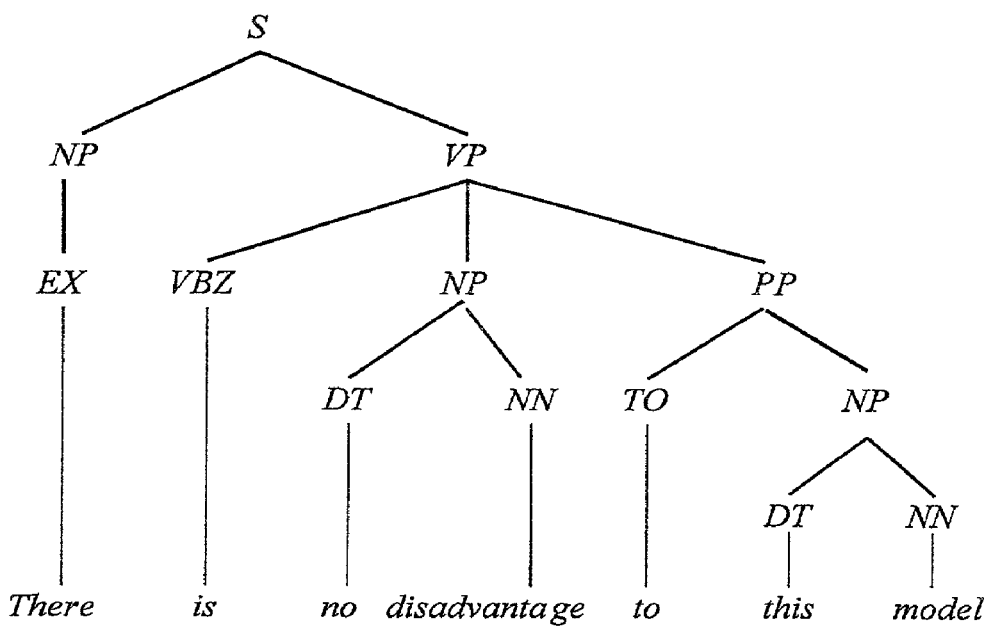
FIG. 4 shows an example of a user's syntactic error table.
FIG. 5 shows a grammar tree with the errors marked under the leaves.
FIG. 6 shows an example of the process of maintaining a user's syntactic error table.

As a first example, a student's syntactic error table is shown in FIG. 4, where the first column records the syntactic subtrees, the second column records the associated leaves which correspond to errors of the syntactic subtrees, and the last column records the frequency of errors in the syntactic subtrees.

As a second example, suppose a student has inputted to the computer a sentence, "There are no disadvantage to this models" as a translation of the Japanese sentence, meaning, "There is no disadvantage to the model", and the grammar tree shown in FIG. 5 is obtained. Locating the following two syntactic subtrees with error markers, the current system will keep the error records in the error table: VP(VBZ NP PP) with the associated leaf VBZ, and NP(DT NN) with the associated leaf NN.

Next, suppose that the current syntactic error table for user A is given as in FIG. 4. Since NP(DT NN) already exists in the table, we only add "1" in the frequency field of the corresponding field, and add NN in the associated leave field. Since VP(VBZ NP PP) is not in the table, we add VP(VBZ NP PP) in the table, with the associated leaf VBZ and assign "1" in the frequency field. The result is shown as FIG. 6.

C. Proficiency Level Contingent Feedback and Remediation

To complete the learners' model, the system needs to prepare several sets, for example three, of remediation materials or example sentences for each of the syntactic errors listed in the column of syntactic subtrees in a learner' syntactic error table, where each of the sets corresponds to a different level of learners. After completing a certain number of problem assignments, the computer-implemented system first finds the most frequent syntactic errors by sorting the frequency rows of the user's syntactic error table. Making use of averaged scores of a learner, an adequate level of prepared remedial materials is selected.

More particularly, suppose the following three different levels of remediation examples are prepared for the syntactic error: NP(DT NN) which are given in the order of difficulty:

I have an apple.

The computing resource is available in our university.

There is enough reason to believe that a UFO had visited our city.

Suppose after completing the first 10 problems, one of the most frequent syntactic errors found is NP(DT NN); this is to be found by seeking a maximum of the last column of the user's syntactic error table. The system selects the most adequate remediation sentence of these three depending upon the learner's proficiency level.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method of analyzing grammar using a part-of-speech tagged parser with a template-based computer-assisted learning system implemented on a computer to teach language to a learner comprising the steps of:

preassigning words and phrases of an input sentence with part-of-speech tags;

regarding any phrase preassigned with a part-of-speech tag as one word;

setting a probability of preassigned words having a given tag as 1;
setting a probability of any word having a tag as 0 if the word has been assigned with a different tag;
obtaining a plurality of grammar trees;
finding a combination within said plurality of grammar trees to maximize probability of the final grammar tree being any of a grammar tree with the following formula to choose the one with largest probability $P_{tree}$:

$$P_{tree}(T) = \prod_{rule_i in T} P_{rule_i} \cdot \prod_{tag_j of\ word_j in T} (P(tag_j | word_j))^2$$

where $P_{rule_i}$ denotes the probability of a rule to take on $rule_i$, $P(tag_j|word_j)$ is the probability of the word$_j$ being assigned to part-of-speech tag be tag$_j$; and
using said final grammar tree to provide error feedback to and teach said learner correct sentence grammar.

2. A method of applying a part-of-speech tagged (POST) parser in a template-automaton-based computer-assisted language learning system using a computer, comprising the steps of:

reading an input sentence keyed into the computer;
checking the sentence with a standard spell check model by said computer, and correcting spelling errors;
finding, using said computer, a best matched path having a highest similarity value with the input sentence;
providing lexical error information, feedback information as well as a score of the input sentence to a learner;
according to the error feedback information, finding a correct path in the template using said computer;
applying the POST parser to obtain a syntactically bracketed grammar structure for the correct path using said computer, said POST parser regarding any phrase preassigned with a part-of-speech tag as one word, setting a probability of preassigned words having given tags as 1, and setting a probability of each word having a tag as 0 if the word has been assigned with a different tag; and
drawing a grammar tree of the correct path on a display and marking the errors at leaves of said grammar tree using said computer;
whereby said learner receives instruction and is able to learn proper language grammar.

\* \* \* \* \*